United States Patent [19]
Dichter

[11] Patent Number: 6,102,353
[45] Date of Patent: Aug. 15, 2000

[54] TILT MOUNTING

[75] Inventor: Carl R. Dichter, Chandler, Ariz.

[73] Assignee: Intel Corporation, Santa Clara, Calif.

[21] Appl. No.: 09/084,071

[22] Filed: May 22, 1998

[51] Int. Cl.[7] .................................................. A47G 29/00
[52] U.S. Cl. ............................ 248/371; 108/5; 248/454
[58] Field of Search ............................ 248/371, 372.1, 248/396, 397, 917, 919, 920, 923, 160, 161, 178.1, 454; 108/1, 5, 138; 297/423.41, 423.39

[56] References Cited

U.S. PATENT DOCUMENTS

| | | | |
|---|---|---|---|
| D. 278,578 | 4/1985 | Jensen | D6/419 |
| 1,767,950 | 6/1930 | Westbrook | 248/454 |
| 2,051,490 | 8/1936 | Lightfoot | 108/32 |
| 4,387,875 | 6/1983 | Ohori | 248/480 |
| 4,395,010 | 7/1983 | Helgeland et al. | 248/371 |
| 4,441,432 | 4/1984 | Carlton | 108/5 |
| 4,565,343 | 1/1986 | Lake, Jr. et al. | 248/346 |
| 4,569,498 | 2/1986 | Ermanski | 248/44.1 |
| 5,340,076 | 8/1994 | Dockwiller, III | 248/371 |
| 5,484,124 | 1/1996 | Billings | 248/118 |
| 5,769,369 | 6/1998 | Meinel | 248/176.1 |
| 5,834,751 | 11/1998 | Jager et al. | 235/462 |
| 5,884,888 | 3/1999 | Grimes, III et al. | 248/441.1 |

*Primary Examiner*—Anita M. King
*Attorney, Agent, or Firm*—Trop, Pruner & Hu, P.C.

[57] ABSTRACT

An object may be adjustably mounted with respect to a base on one or more plastic straps which extend between the base and the object. The object may be translated with respect to the straps which may be fixed so as to vary the extension of the strap or straps into the object. In this way, the position of the object may be rotationally adjusted with respect to the base and translated towards and away form the base as well. This arrangement may be particularly suitable for mounting flat screen displays for computer systems in a low profile, low cost arrangement that allows multiple degrees of freedom of movement.

32 Claims, 3 Drawing Sheets

TILT MOUNTING

BACKGROUND

This invention relates generally to mounting objects so that they may be adjustably tilted and particularly to such mountings useful in connection with computers and computer peripherals.

Liquid crystal displays (LCDs) are utilized with computers to display information. The clarity of the information on the display is to some degree a function of the tilt angle of the display. Thus it is desirable to allow LCD devices to be tiltably mounted so that the user can adjust the orientation of the screen to achieve the best viewability.

LCDs and other flat screen displays are enjoying increasing popularity. Many users prefer the flat screen displays over a conventional monitor because the flat screen display takes considerably less desk space. These screens may be mounted on a support and may be tiltably adjustable using a ball and socket type of mounting arrangement.

Generally, these LCD mounting arrangements give limited degrees of freedom of movement. Basically they allow only tilting translation of the display. In addition the mounting structure may take a relatively large amount of space thereby, to some degree, defeating one of the major benefits of the use of the flat screen display. In addition the attendant hardware may add to the cost of the computer system.

Thus there is a continuing need for a technique for mounting a variety of devices, such as flat screen displays, which has a low profile, is economical, and provides freedom of movement.

SUMMARY

In accordance with one aspect, a support for an object such as a computer display includes a base and a mounting portion connectable to the display. An elongate member connects the base and the mounting portion such that the distance between the base and the mounting portion may be adjusted.

DETAILED DESCRIPTION

Figure 1:
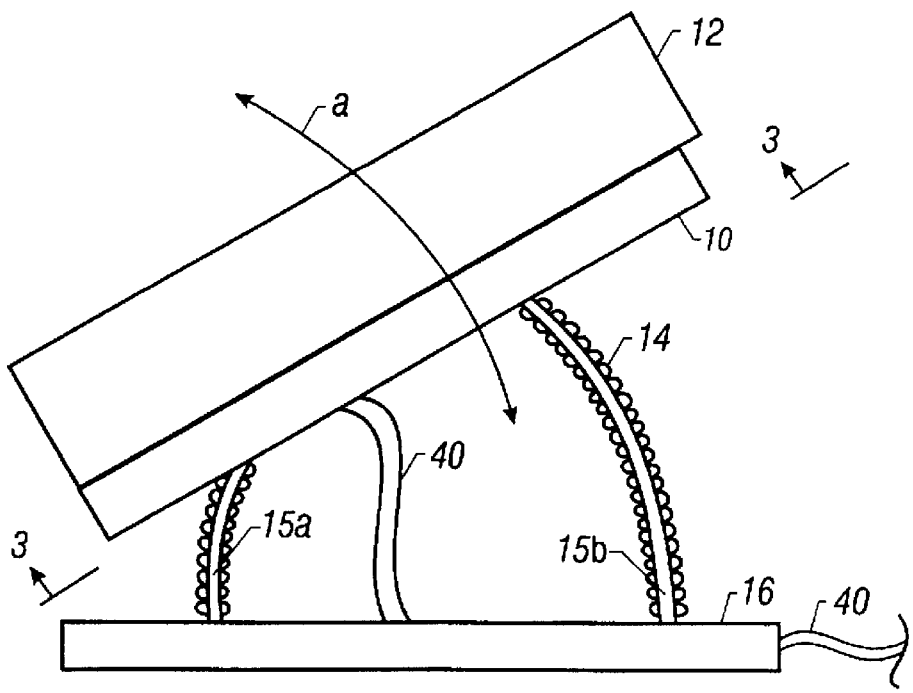
FIG. 1 is a side elevational view of one embodiment of the present invention.

Referring to FIG. 1, an object 12 which could be a flat screen display for a computer system is connected to a mounting portion 10. The portion 10 in turn is supported by one or more elongate members such as the plastic strap 14. The plastic strap 14 is secured on its ends 15a and 15b to a base 16. As indicated by the arrows A, the object 12 may be translated angularly to various angles of operation with respect to the user. Similarly, the object 12 may be translated linearly towards and away from its base 16.

Figure 2:
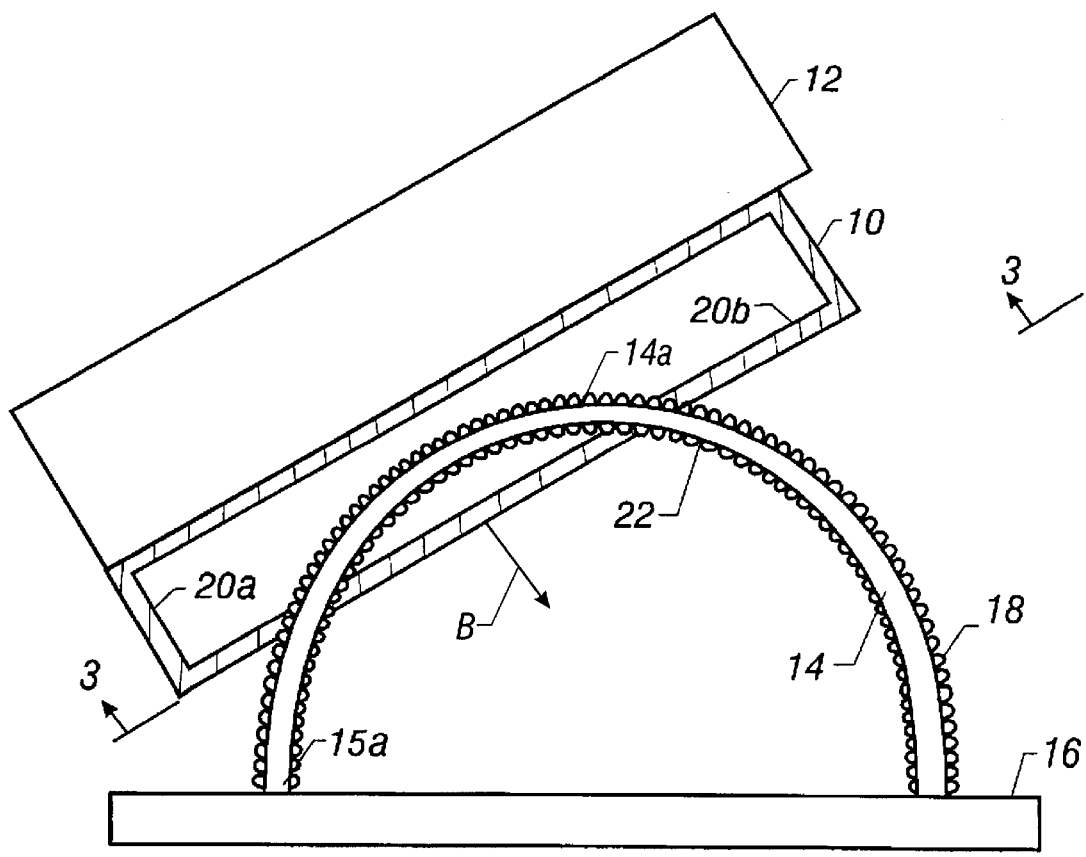
FIG. 2 is an enlarged, partially cross-sectioned view of the embodiment shown in FIG. 1.

Referring now to FIG. 2, the strap 14 is formed with a plurality of rounded protrusions 18 along each of its sides. The strap 14, for example, may be made of relatively stiff plastic. Each of the protrusions 18 may have a curved outer configuration. The strap 14 extends through a pair of openings 22 in the mounting portion 10 and may form an internal loop 14a inside the mounting portion 10.

A pair of displaceable catches 20a and 20b may be formed integrally in the mounting portion 10 to control the inward and outward translation of the strap 14 with respect to the mounting portion 10. The illustrated embodiment would be useful for example, in mounting flat screen computer displays such as liquid crystal displays. The position of the display with respect to the user may be angularly oriented as desired through a simple motion. In addition, the display 12 may be moved towards and away from its base 16 and therefore translated with respect to the user as well. For example, one potential application for the system is in connection with mounting flat screen displays in car personal computer systems.

Figure 3:
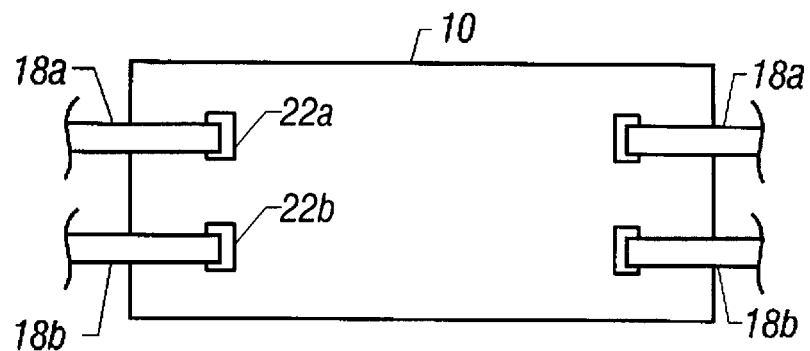
FIG. 3 is a cross-sectional view taken generally along the line 3—3 in FIG. 2.

In certain embodiments, a plurality of parallel straps may be utilized to provide additional degrees of freedom of movement of the object 12 with respect to the mounting portion 10 and to provide additional support for objects whose weight dictates the additional support. Thus, in FIG. 3, a pair of straps 18a and 18b are fed through two pairs of openings 22a and 22b to support the object 12.

Figure 4:
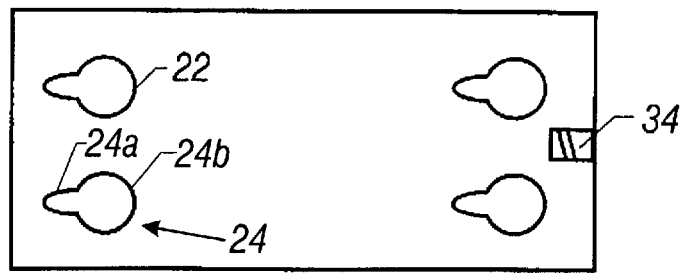
FIG. 4 is a bottom plan view of an object to be mounted in accordance with one aspect of the present invention.
Figure 5:
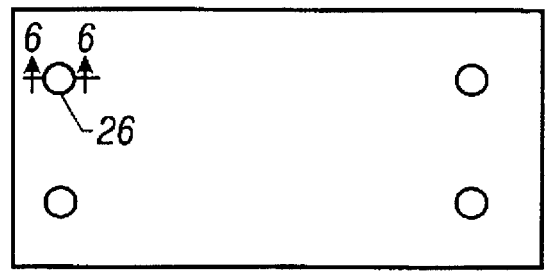
FIG. 5 is a top plan view of the mounting portion shown in FIG. 1.
Figure 6:
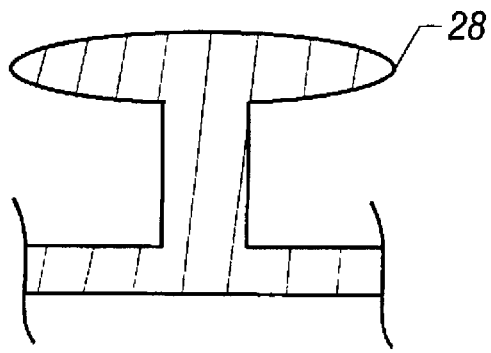
FIG. 6 is an enlarged, partial cross-sectional view taken generally along the line 6—6 in FIG. 5.

The mounting portion 10 may be secured to the object 12 using an insert and translate connection. The object 12 may include a plurality of teardrop shaped openings 24 each having a narrower end 24a and an enlarged end 24b, as shown in FIG. 4. The mounting base 10 may include a plurality of connectors 26, as shown in FIGS. 5 and 6, arranged to be inserted into the enlarged ends 24b of the openings 24. With the buttons 28 of the connectors 26 inserted in the enlarged openings 24b, the object 12 may be translated with respect to the mounting portion 10 to lock the buttons 28 in the narrower ends 24a. This prevents the object 12 from being displaced (relative to the portion 10) transversely to the plane of the object 12.

Figure 7A:
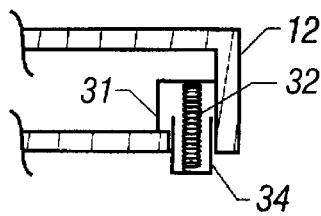
FIG. 7a is a reduced, partial cross-sectional view, corresponding to FIG. 2, taken along the upper end of one embodiment of the present invention.
Figure 7B:
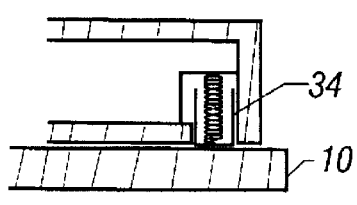
FIG. 7b shows the embodiment of FIG. 7a with the mounting portion positioned on an object for connection thereto.
Figure 7C:
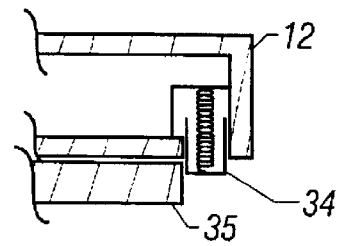
FIG. 7c shows the embodiment of FIG. 7b after the mounting portion has been translated and locked in place.

The object 12 may be releasably locked on the mounting portion 10 using the spring-biased pushbutton 34, shown in FIG. 7a. The pushbutton 34 is biased out of the object 12 by a spring 32 constrained in a housing 31. When the mounting portion 10 has its connectors 26 engaged in the enlarged ends 24b of the openings 24 in the object 12, the object 12 and the mounting portion 10 is located as shown in FIG. 7b. In this position, the catch 34 is automatically biased inwardly into the object 12. When the object 12 is translated relative to the mounting portion 10 causing the buttons 28 to move into engagement with the narrower ends 24a of the openings 24, the pushbutton 34 is spring biased outwardly, as shown in FIG. 7c. In this position, the object 12 is releasably locked on the mounting portion 10. Namely, the object 12 cannot move in a plane transverse to the mounting portion 10 because the buttons 28 engage the narrower ends 24a. Similarly, translation, which would allow the buttons 28 to be removed from the enlarged ends 24b, is prevented by the releasable engagement of the pushbutton 34 on the end 35 of the mounting portion 10.

Figure 8:
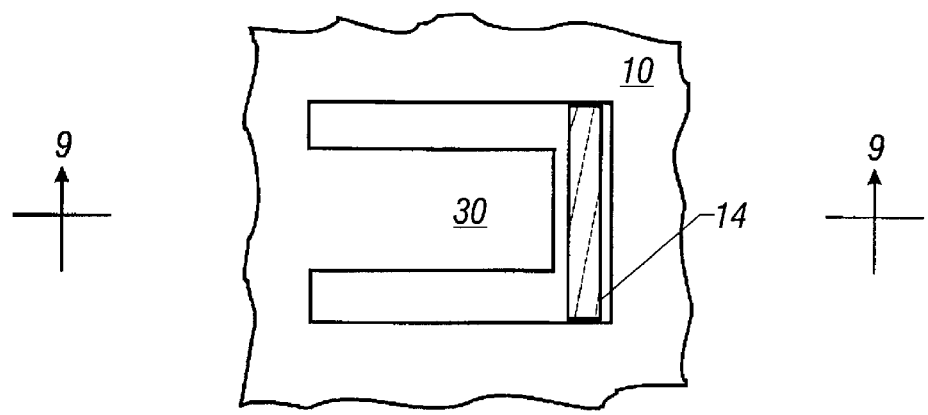
FIG. 8 is enlarged, partial, partially sectioned view of a portion of the bottom of the object shown in FIG. 3.

Each strap 14 extends through an opening 22 into the mounting portion 10 and is held in position by a catch such as the locking tab 30, as shown in FIG. 8. Advantageously, the tab 30 is formed integrally in the mounting portion 10 to decrease the number of parts and to reduce cost. However non-integral locking members may be utilized as well.

Figure 9:
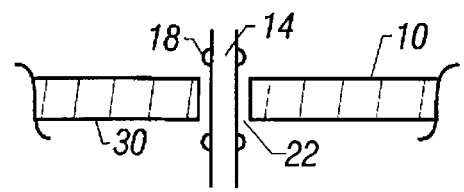
FIG. 9 is a partial, vertical cross-sectional view taken generally along the line 9—9 in FIG. 8.

The inward and outward translation of the strap 14 through the opening 22 is constrained, as shown in FIG. 9. Namely, the outwardly extending protrusions 18 are sufficiently wide to prevent the ingress or egress of the strap 14 with respect to the opening 22. Thus, the object 12 is releasably locked in position relative to the mounting portion 10.

Figure 10:
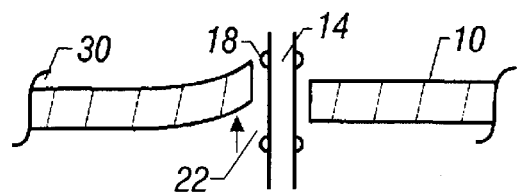
FIG. 10 is a cross-sectional view corresponding to FIG. 9 after the locking tab is biased out of position.

However, as shown in FIG. 10, by flexing and displacing the locking tab 30 inwardly, the strap 14 is freed to move into or out of the mounting portion 10. In this way the position of the object 12 may be angularly adjusted with respect to the base 16. In addition, the distance of the object 12 from the base 16 may be adjusted as well. The adjustments occur in a clean fashion because any excess portion of the strap 14 forms the loop 14a, stored out of the user's sight inside the mounting portion 10.

One can also forcibly displace the object 12 without pressing the tabs 30. The tabs 30 are biased out of the way by the excessive force applied through the protrusions 18.

By simply applying an inward pressure, as indicated by the arrows B in FIG. 2, the user can with one hand adjust the position of the object 12 with respect to the base 16. Referring to FIG. 2, in units using a single strap 14, the user can apply pressure using one hand at 20a and using the other hand at 20b. The user then simply moves the object 12 into the desired position. The user may release the bias supplied at 20a and 20b and the object 12 is locked at the desired position. With multiple straps 14, it may be necessary for the user to adjust the positioning at two locations at a time. Thus, the final positioning, with multiple straps, may be the result of multiple stages of adjustment.

Referring to FIG. 1, an electrical connection 40 may be made from the base to the object 12 through the mounting portion 10. Electrical wires may be enclosed in a semirigid material to distribute the curvature stresses on the electrical wires during the repositioning of the object 12 relative to its base 16.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A support for an object, comprising:
   a base;
   a mounting portion connectable to the object to be supported; and
   a flexible member connecting the base and the mounting portion such that the distance between the base and the mounting portion may be adjusted, said flexible member extending into said mounting portion at two spaced locations, said mounting portion including a catch at at least one of said locations to engage said flexible member.

2. The support of claim 1 wherein said mounting portion is connected to a flat display screen, said screen being tiltably adjustable with respect to said base.

3. The support of claim 2, wherein said flexible member is a plastic strap having a plurality of serially spaced protrusions along its length.

4. The support of claim 1, wherein said mounting portion includes a housing which receives a portion of said member.

5. The support of claim 4, wherein said member is translatable into and out of said housing to vary the spacing of said mounting portion from said base.

6. The support of claim 1 wherein said catch engages a protrusion on said member and controls the inward and outward extension of said member into said mounting portion.

7. The support of claim 6, wherein said catch is formed integrally in said mounting portion.

8. The support of claim 7, wherein said member extends into said mounting portion at two spaced locations, said mounting portion including a pair of catches at each of said locations to engage said member.

9. The support of claim 1, wherein said mounting portion is releasably connectable to said object.

10. A support for a computer display, comprising:
    a base;
    a mounting portion; and
    a loop adjustably connected between the base and the mounting portion wherein said loop is a plastic strap having a plurality of serially spaced protrusions along its length.

11. The support of claim 10, wherein said mounting portion includes a housing which receives a portion of said loop.

12. The support of claim 10, wherein said strap is translatable into and out of a housing which receives a portion of said loop to vary the spacing of said mounting portion from said base.

13. The support of claim 12 including a catch which engages a protrusion on said strap and controls the inward and outward extension of said strap into said housing.

14. The support of claim 13, wherein said catch is formed integrally in said mounting portion.

15. The support of claim 14, wherein said strap extends into said mounting portion at two spaced locations, said mounting portion including a catch at each of said locations to engage said strap.

16. The support of claim 10, wherein said mounting portion is releasably connectable to said display.

17. A support for a computer display, comprising:
    a housing releasably connectable to the display;
    a base;
    a flexible element adjustably extendable from the base into the housing to adjust the position of the display; and
    a catch which engages a protrusion on said element and controls the inward and outward extension of said element into said housing.

18. The support of claim 17, wherein said element is a plastic strap having a plurality of serially spaced protrusions along its length.

19. The support of claim 18, wherein said housing receives a portion of said strap.

20. The support of claim 19, wherein said strap is translatable into and out of said housing to vary the spacing of said housing from said base.

21. The support of claim 18, wherein said catch is formed integrally in said housing.

22. The support of claim 21, wherein said strap extends into said housing at two spaced locations, said housing including a pair of catches at each of said locations to engage said strap.

23. A support for an object, comprising:

a base;

a mounting portion connectable to the object to be supported;

a loop connected to the base and the mounting portion such that the distance between said base and the mounting portion may be adjusted; and a catch which engages a protrusion on said loop and controls the inward and outward extension of said loop into said mounting portion.

24. The support of claim 23, wherein said catch is formed integrally in said mounting portion.

25. The support of claim 24, wherein said loop extends into said mounting portion in two spaced locations, said mounting portion including a pair of catches at each of said locations to said engage said mounting portion.

26. A support for a computer display, comprising:

a base;

a mounting portion;

a flexible strap adjustably connected between the base and the mounting portion, said strap having a plurality of serially spaced protrusions along its length; and said strap extending into said mounting portion at at least two spaced locations, said mounting portion including a catch at at least one of said locations to engage said strap.

27. The support of claim 26, wherein said strap is translatable into and out of a housing which receives a portion of said strap to vary the spacing of said mounting portion from said base.

28. The support of claim 27 wherein said catch controls the inward and outward extension of said strap into said housing.

29. The support of claim 28 wherein said catch is formed integrally in said mounting portion.

30. The support of claim 29 wherein said mounting portion including a catch at each of said locations to engage said strap.

31. A support for a computer display, comprising:

a base;

a mounting portion; and a loop adjustably connected between the base and the mounting portion,which receives portion including a housing which receives a portion of said loop.

32. A support for a computer display comprising:

a housing releasably connectable to the display;

a base;

a flexible element adjustably extendable from the base into the housing to adjust the position of the display, said element including a plurality of serially spaced protrusions along its length; and a catch which engages a protrusion on said element and controls the inward and outward extension of said element into said housing, said catch being formed integrally in said housing.

* * * * *

UNITED STATES PATENT AND TRADEMARK OFFICE
CERTIFICATE OF CORRECTION

PATENT NO. : 6,102,353
DATED : August 15, 2000
INVENTOR(S) : Carl R. Dichter

It is certified that error appears in the above-identified patent and that said Letters Patent are hereby corrected as shown below:

Column 5, line 23, delete "said", first occurrence.

Signed and Sealed this

Seventeenth Day of April, 2001

Attest:

NICHOLAS P. GODICI

Attesting Officer     Acting Director of the United States Patent and Trademark Office